US012747016B1

(12) United States Patent
Howe et al.

(10) Patent No.: US 12,747,016 B1
(45) Date of Patent: Sep. 29, 2026

(54) HYBRID THERMOSET AND THERMOPLASTIC COMPOSITE AIRPLANE WINGS EMPLOYING THERMOPLASTIC CO-BONDING

(71) Applicant: The Boeing Company, Arlington, VA (US)

(72) Inventors: Christopher Alan Howe, Albert Park (AU); Phillip John Crothers, Hampton East (AU); Nikita Budwal, Lynnwood, WA (US); Alexander Michael Rubin, Arlington, VA (US); Ying Shi, Maryland Heights, MO (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 19/097,393

(22) Filed: Apr. 1, 2025

(51) Int. Cl.

| | |
|---|---|
| ***B64C 3/20*** | (2006.01) |
| ***B64C 3/18*** | (2006.01) |
| ***B64C 3/26*** | (2006.01) |
| ***B64F 5/10*** | (2017.01) |

(52) U.S. Cl.
CPC ................ *B64C 3/20* (2013.01); *B64C 3/185* (2013.01); *B64C 3/187* (2013.01); *B64C 3/26* (2013.01); *B64F 5/10* (2017.01)

(58) Field of Classification Search
CPC ........................................................ B64C 3/18
See application file for complete search history.

(56) References Cited

U.S. PATENT DOCUMENTS

| | | | | |
|---|---|---|---|---|
| 5,667,881 | A | 9/1997 | Rasmussen et al. | |
| 6,776,371 | B2 * | 8/2004 | Tanaka | B64C 3/20 244/123.7 |
| 7,334,782 | B2 | 2/2008 | Woods et al. | |
| 8,444,087 | B2 * | 5/2013 | Kismarton | B29C 66/72141 428/113 |
| 8,790,486 | B2 | 7/2014 | Hou et al. | |
| 8,864,075 | B2 * | 10/2014 | Gray | B64C 1/064 244/119 |
| 8,973,871 | B2 * | 3/2015 | Marcoe | B32B 5/022 264/258 |
| 9,145,197 | B2 * | 9/2015 | Moselage, III | B64C 3/20 |
| 9,211,674 | B2 | 12/2015 | Van Tooren | |
| 9,358,764 | B2 | 6/2016 | Prebil et al. | |
| 9,517,833 | B2 * | 12/2016 | Kent | B64C 3/18 |
| 10,040,537 | B2 * | 8/2018 | Charles | B64C 3/26 |
| 10,328,676 | B2 | 6/2019 | Jacobsen et al. | |
| 10,981,337 | B2 | 4/2021 | Erb et al. | |
| 11,220,072 | B2 | 1/2022 | Scarfe et al. | |
| 11,260,954 | B2 * | 3/2022 | Whitmer | B64C 3/18 |
| 11,298,924 | B2 | 4/2022 | Kruckenberg | |
| 11,642,860 | B2 | 5/2023 | Ogale | |

(Continued)

FOREIGN PATENT DOCUMENTS

| | | | |
|---|---|---|---|
| EP | 1555204 | A1 | 7/2005 |
| EP | 4458561 | A1 | 11/2024 |

OTHER PUBLICATIONS

European Patent Office Extended Search Report, dated Jul. 29, 2026, regarding Application No. EP26168897.2, 8 pages.

*Primary Examiner* — Arfan Y. Sinaki
(74) *Attorney, Agent, or Firm* — Yee & Associates, P.C.

(57) ABSTRACT

A composite airplane wing utilizes both fiber reinforced thermoset and thermoplastic components that are co-bonded using a thermoplastic bonding film.

20 Claims, 12 Drawing Sheets

(56) References Cited

U.S. PATENT DOCUMENTS

| | | | | |
|---|---|---|---|---|
| 2003/0042364 | A1* | 3/2003 | Tanaka | B64C 3/20<br>244/123.2 |
| 2014/0209744 | A1* | 7/2014 | Marcoe | B32B 3/12<br>156/292 |
| 2015/0298388 | A1* | 10/2015 | Wong | B29C 66/73921<br>428/419 |
| 2016/0318597 | A1* | 11/2016 | Kent | B64C 3/182 |
| 2016/0325822 | A1* | 11/2016 | Mosqueira | B64C 3/182 |
| 2017/0210053 | A1* | 7/2017 | Osborne | B29C 66/73941 |
| 2018/0086429 | A1 | 3/2018 | Sheppard et al. | |
| 2021/0107621 | A1* | 4/2021 | Whitmer | B64C 3/182 |
| 2023/0159754 | A1 | 5/2023 | Shi et al. | |
| 2023/0202138 | A1 | 6/2023 | Shi et al. | |
| 2024/0293978 | A1 | 9/2024 | Pantoja et al. | |

* cited by examiner

HYBRID THERMOSET AND THERMOPLASTIC COMPOSITE AIRPLANE WINGS EMPLOYING THERMOPLASTIC CO-BONDING

BACKGROUND INFORMATION

1. Field

The disclosure broadly relates to composite structures, and deals more particularly with airplane wings formed of a combination of thermoset and thermoplastic co-bonded components, as well as a method of making the wings.

2. Background

Thinner airplane wings are desirable because they reduce aerodynamic drag and attendant fuel burn. However, thin wing designs, especially those having a high aspect ratio, present a number of challenges. Long thin wings must be strong enough to react high aeroelastic bending forces because of their length. Also, high aspect ratio wings are difficult to manufacture because they utilize thinner, complicated components that are challenging to fabricate and assemble.

In addition to the performance and manufacturing challenges mentioned above, there is a need to produce thin wings at higher rates than has been possible in the past, using simplified, and highly efficient production techniques with less labor and lower equipment costs.

Accordingly, it would be desirable to provide a wing design and related production method that avoid the disadvantages mentioned above.

SUMMARY

The disclosure relates in general to airplane wings, and more specifically to an airplane wing design that is especially suitable for airplanes requiring long, thin wings. The disclosure also relates to a highly efficient, simplified method of fabricating airplane wings, particularly those having a high aspect ratio.

According to one aspect, an airplane wing comprises a wing substructure, an upper wing skin assembly, and a lower wing skin assembly. The upper wing skin assembly includes a composite upper wing skin and a first plurality of composite stringers co-bonded to the upper wing skin assembly by a low temperature thermoplastic bonding film. The lower wing skin assembly includes a composite lower wing skin and a second plurality of composite stringers co-bonded to the lower wing skin by a low temperature thermoplastic bonding film. The upper wing skin assembly and the lower wing skin assembly are co-bonded to the wing substructure by a low temperature thermoplastic bonding film.

According to another aspect, an airplane wing comprises a wing substructure, a lower composite wing skin and an upper composite wing skin co-bonded to the wing substructure by a low temperature thermoplastic bonding film.

According to still another aspect, an airplane wing comprises a wing substructure, an upper composite wing skin, and a lower composite wing skin. The wing substructure includes a composite front spar, a composite rear spar, and a plurality of composite ribs extending between the composite front spar and the composite rear spar. The upper composite wing skin is co-bonded to the wing substructure by a low temperature thermoplastic bonding film.

According to another aspect, an airplane wing comprises a plurality of fiber reinforced polymer wing components each having a glass transition temperature. The fiber reinforced polymer wing components are co-bonded by a thermoplastic bonding film having a melt temperature less than the glass transition temperature of the fiber reinforced polymer wing components.

According to a further aspect, a method is provided of fabricating an airplane wing comprising making upper and lower composite wing skin assemblies and a wing substructure. The method further includes attaching the upper composite wing skin assembly and the lower composite wing skin assembly to the wing substructure, including co-bonding at least one of the upper composite wing skin assembly and the lower composite wing skin assembly to the wing substructure using a low temperature thermoplastic bonding film.

According to another aspect, a method is provided of fabricating an airplane wing, comprising making an upper composite wing skin assembly, a lower composite wing skin assembly, and a composite substructure. The method further includes co-bonding the lower composite wing skin assembly to the composite wing substructure using a low temperature thermoplastic bonding film. The method also includes attaching the upper composite wing skin assembly to the composite wing structure using fasteners.

According to still another aspect. A method is provided of making an airplane wing comprising making upper and lower wing skin assemblies, making a wing substructure, bonding the lower wing skin assembly to the wing substructure using a low temperature thermoplastic bonding film, attaching the upper wing skin assembly to the wing substructure. Making the upper wing skin assembly includes co-bonding a plurality of stringers to an upper wing skin using a low temperature thermoplastic bonding film. Making the lower wing skin assembly includes co-bonding a plurality of stringers to a lower wing skin using a low temperature thermoplastic bonding film. Making the wing substructure includes forming a front spar and a rear spar to near net shape, and bonding plurality of ribs to the front spar and the rear spar using a low temperature thermoplastic film.

One of the advantages of the disclosed embodiments is that composite airplane wings can be produced more quickly and at higher production rates. Another advantage is that complex components of the wing can be fabricated using simplified processes and equipment. A further advantage is that reliance on autoclaves to cure composite components is reduced or eliminated. Another advantage is that fewer mechanical fasteners are needed to attach wing skins to a wing substructure. Still another advantage is that the wing design and production method is particularly well-suited for producing long wings having a high aspect ratio that are subject to high aeroelastic deflection. Yet another advantage is that the wing employs an optimized combination of both thermoset and thermoplastic components, as well as a method of joining these components through simple co-bonding processes.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
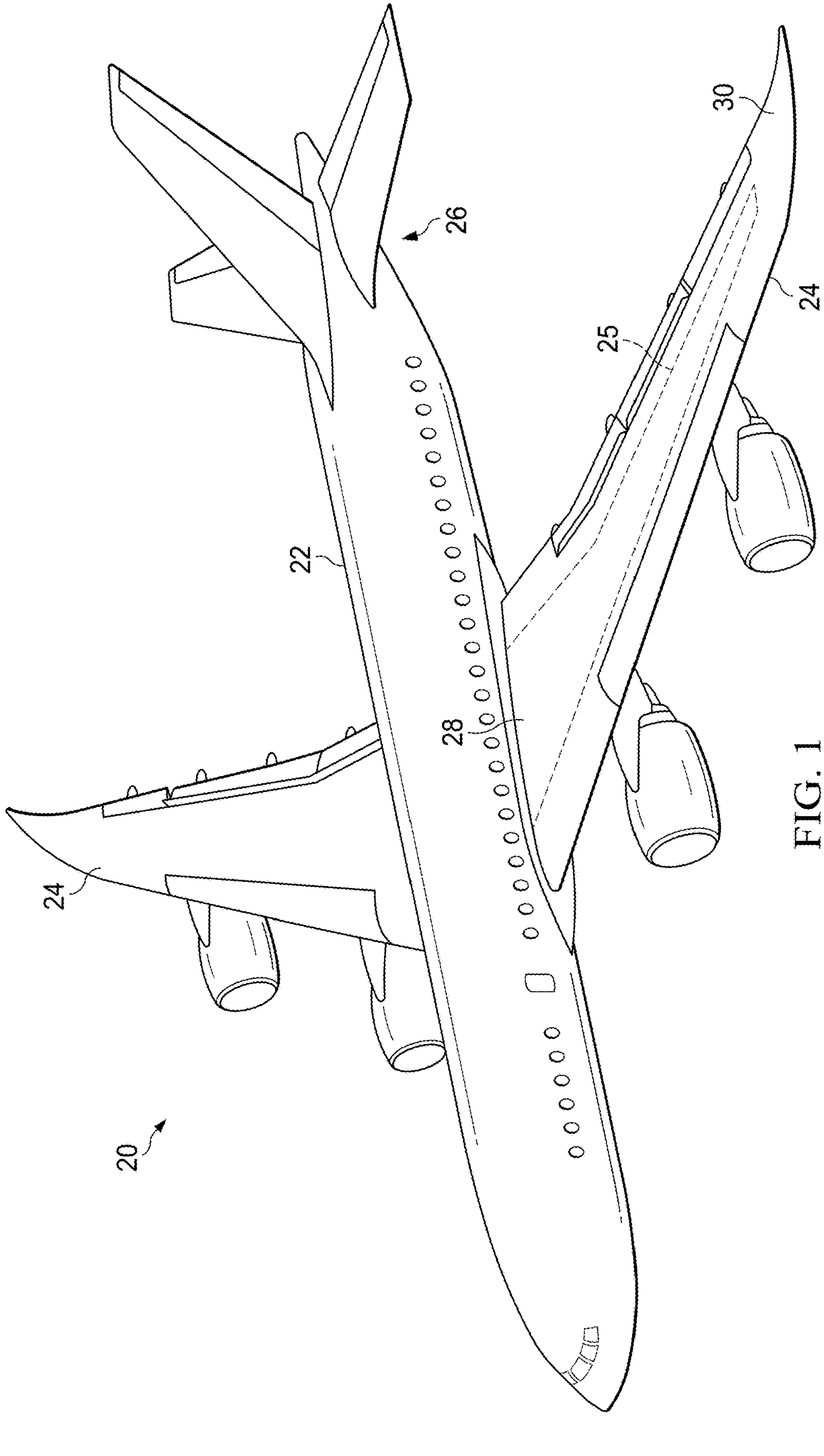
FIG. 1 is an illustration of a perspective view of an airplane having long, thin wings.
Figure 2:
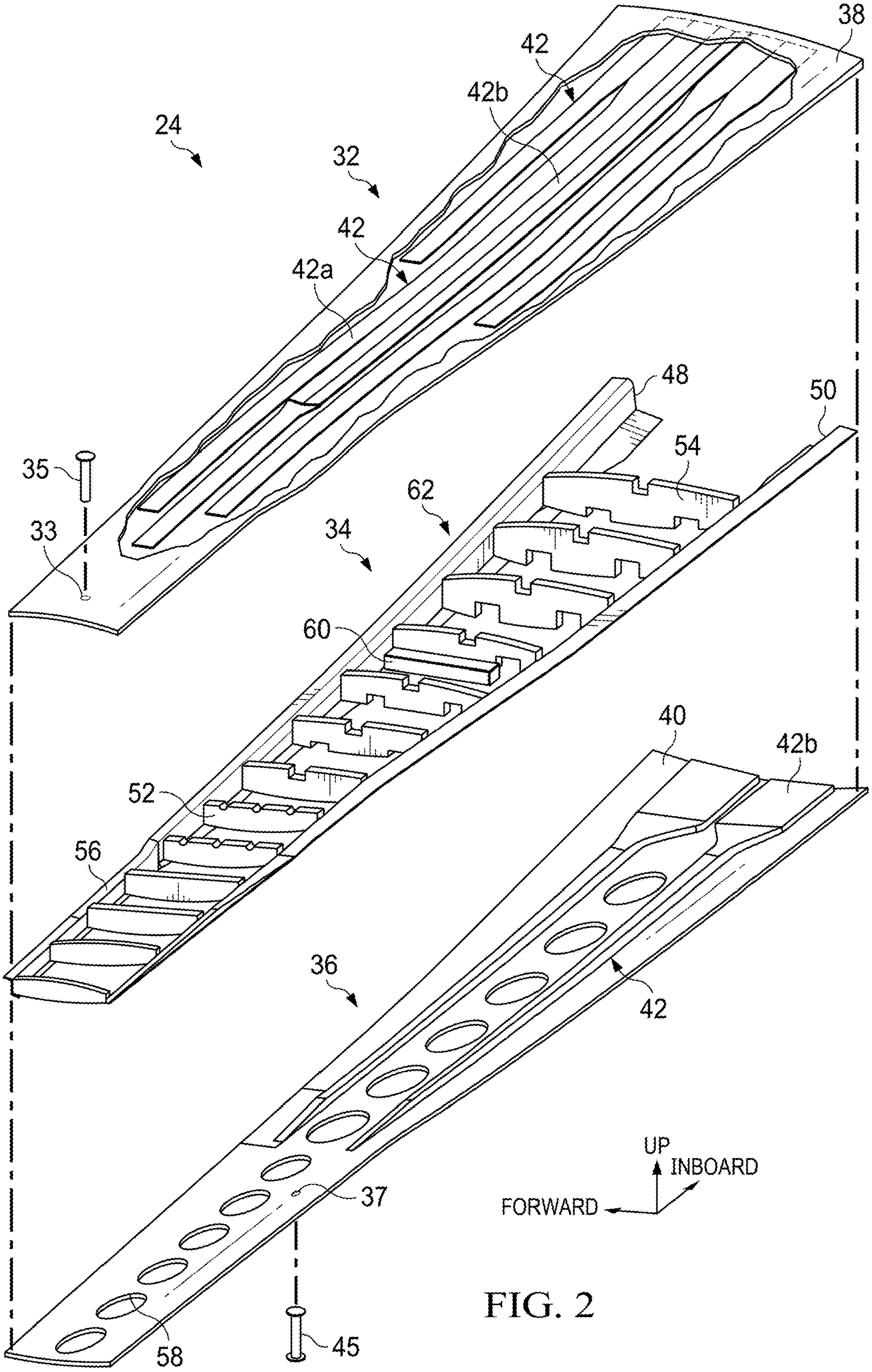
FIG. 2 is an illustration of an exploded, perspective view of one of the wings of the airplane in FIG. 1.
Figure 3:
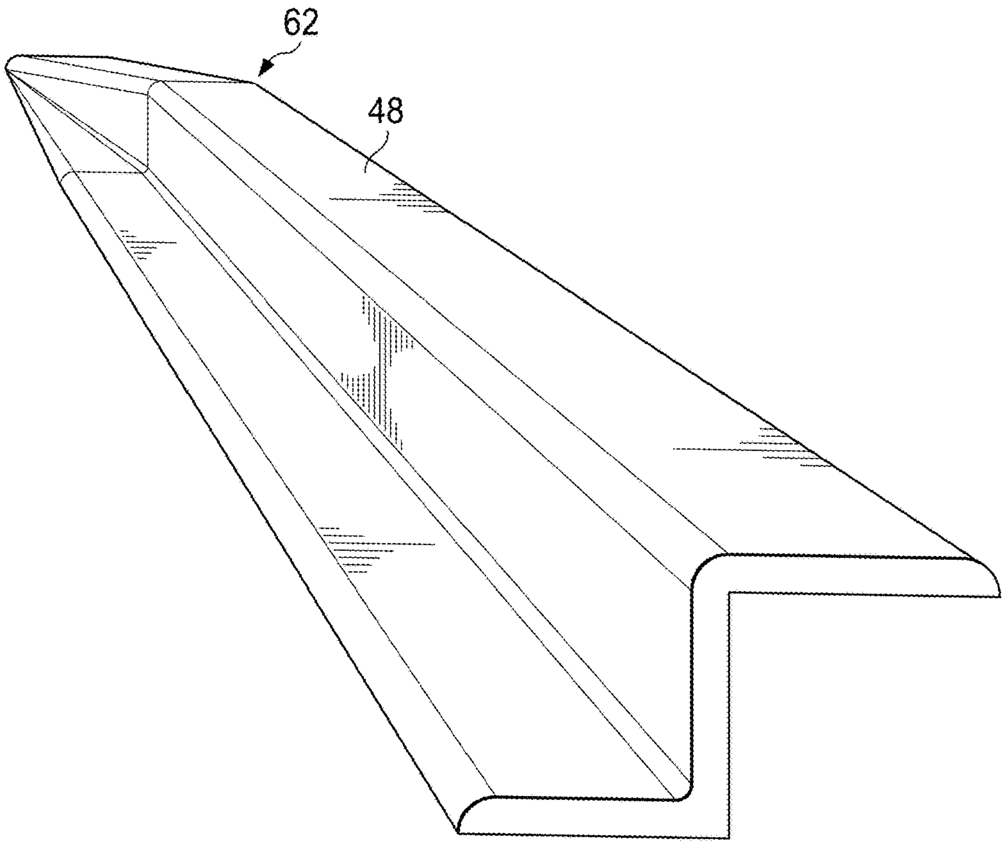
FIG. 3 is an illustration of a perspective view of a spar forming a part of one of the wings.

Referring first to FIG. 1, an airplane 20 comprises a fuselage 22, wings 24 and an empennage 26. Each of the wings 24 comprises a grid of fiber reinforced polymer structural components and wing skins extending from the root 28 to near the tip 30, forming what is sometimes referred to as a wing box. In the disclosed example, each of the wings 24 has a high aspect ratio, meaning that its length is high relative to its thickness. However it should be noted here that the disclosed embodiments are also applicable to airplane wings having normal aspect ratios. As used herein, the term “wing” also includes other types of airfoils such as horizontal and vertical stabilizers, edges, and control surfaces such as flaps, ailerons, elevators, canards, and rudders, to name only a few. The fiber reinforced polymer structural components are co-bonded by a thermoplastic bonding film having a melt temperature that is less than the glass transition temperature of the polymer structural components.

Attention is now directed to FIGS. 2-7 which illustrate additional details of one of the wings 24. The wing 24 broadly comprises an upper wing skin assembly 32, a lower wing skin assembly 36 and a ladder-like substructure 34. The upper wing skin assembly 32 comprises a composite laminate upper wing skin 38 which may be a standard modulus, intermediate modulus, intermediate plus or high modulus CFRP (carbon fiber reinforced plastic) laminate, laid up by an automatic tape or fiber laying or placement machine (not shown), and then cured. The CFRP laminate may be constructed of a thermoset prepreg tape and/or woven fabric, or a thermoset resin infused tape, non-crimped fabric, woven fabric and/or braided fabric. Alternatively, the CFRP laminate may be constructed of thermoplastic prepreg tape, woven fabric and/or braided fabric. The wing skin 38 may also include ancillary materials such as fiberglass, surface films, lightning protection, and woven fabrics.

Figure 6:
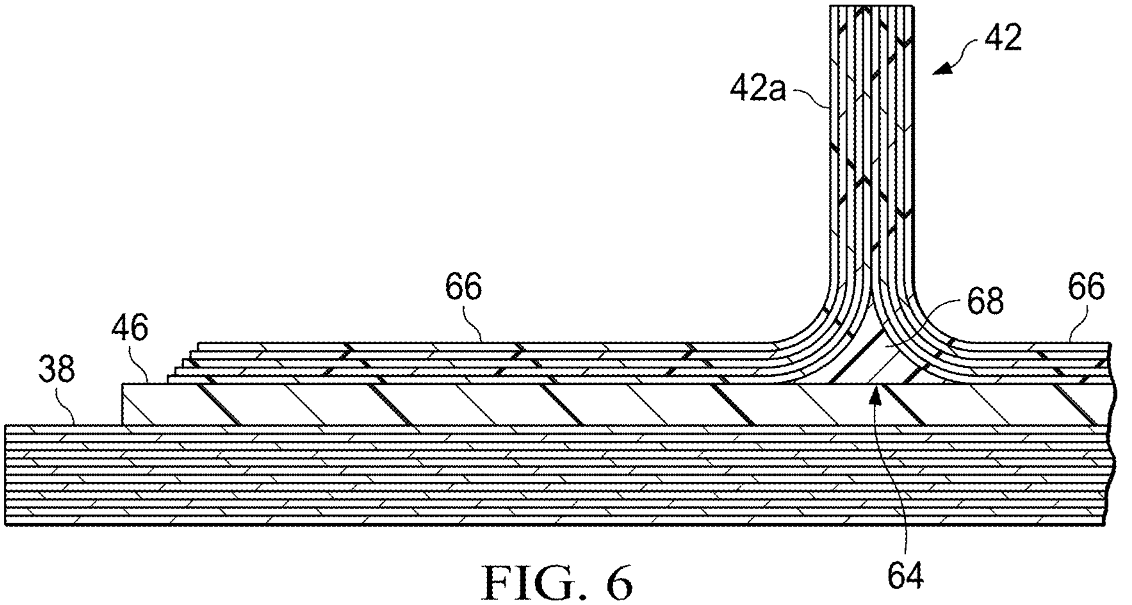
FIG. 6 is an illustration of a cross-sectional view of the stringer shown in FIG. 5.
Figure 7:
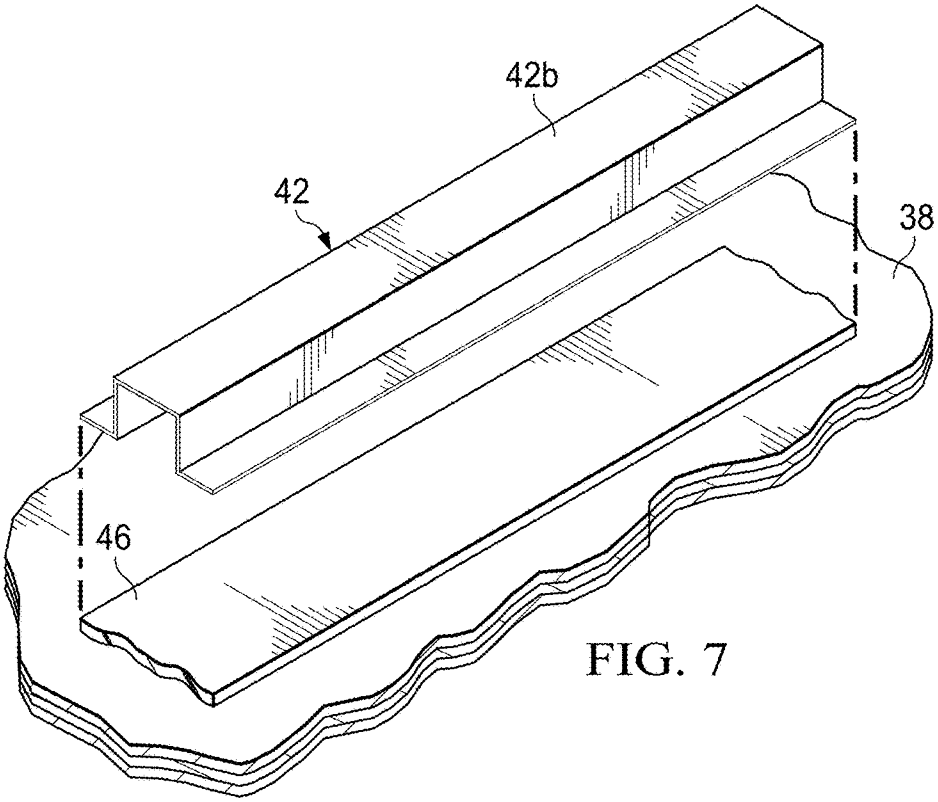
FIG. 7 is an illustration similar to FIG. 5 but showing a vent stringer.

A plurality of spanwise extending stiffeners in the form of composite laminate stringers 42 are attached to the underside of the upper wing skin 38 by a co-bonding process described later. In one example, the stringers 42 are blade stringers **42*a* comprising a CFRP laminate. The CFRP laminate can be a thermoset prepreg tape and/or woven fabric. The CFRP laminate can also be a thermoset resin infused tape, non-crimped fabric, woven fabric and/or braided fabric. Alternatively, the CFRP laminate can be a thermoplastic prepreg tape, woven fabric and/or braided fabric. The stringers 42 can be fabricated either by forming a charge of prepreg to the desired shape, or by resin infusion of dry fibers in a mold (see FIG. 8). FIG. 6 illustrates one form of a blade stringer 42*a* comprising a pair of L-shaped members 66 joined together as by co-curing in which a filler 68, sometimes referred to as a noodle, fills a gap 64 between the two L-shaped members 66. The filler 68** can be constructed either of a thermoset prepreg tape, or a thermoset resin infused braid, or a thermoplastic tape or braid, or a non-continuous reinforced thermoset. Blade stringers having other geometries are possible.

At least some of the stringers 42 may comprise vent stringers **42*b*, sometimes referred to as hat or omega stringers which, which because of their open interior, function as vents carrying vapors through the wing 24, typically to a collection point near the outer tip 30. The vent stringers 42*b* comprise a carbon fiber reinforced thermoplastic braid fabricated either by forming a charge of thermoplastic prepreg to the desired shape, or by resin infusion of dry fibers in a mold. The vent stringers 42*b* may also comprise a combination of braids and non-crimp fabrics, and depending on their design, may require noodles in the form of a reinforcement or adhesive. In those examples where the upper wing skin 38 is thermoplastic, it may be possible to co-cure the thermoplastic stringers 42 and the upper wing skin 38**.

Figure 4:
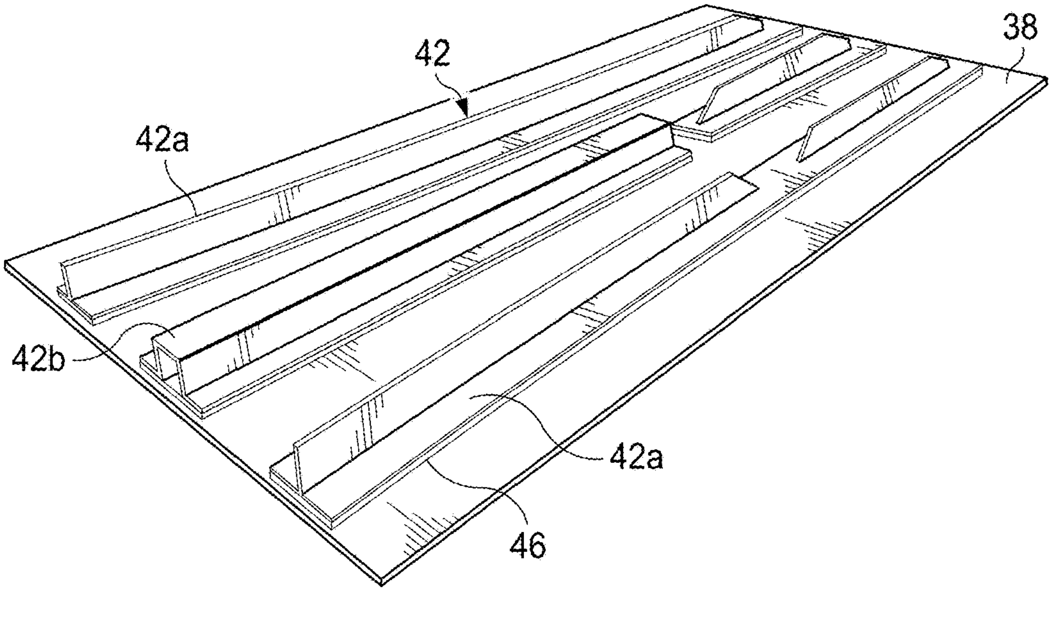
FIG. 4 is an illustration of a perspective view of a portion of an upper wing skin assembly, shown in an inverted position.
Figure 5:
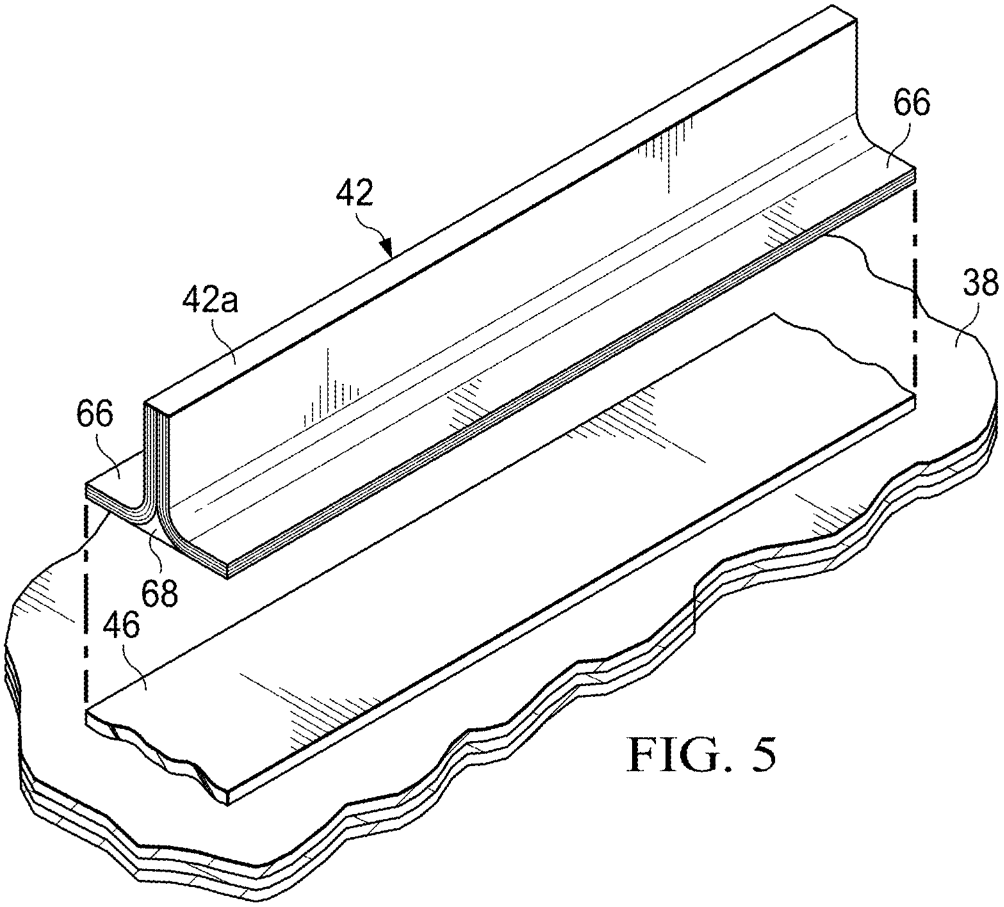
FIG. 5 is an illustration of an exploded, perspective view showing a blade stringer co-bonded to the upper wing skin by a thermoplastic bonding film.

Referring to FIGS. 4 and 5, in those examples where the upper wing skin 38 is a thermoset, the thermoplastic stringers 42 are co-bonded to the upper wing skin 38 using strips of a low melt temperature thermoplastic bonding film 46 (hereinafter referred to as “TP bonding film”). Typically, the TP bonding film 46 has a width that is at least as great as that of the stringer 42. During the assembly process, the strip of TP bonding film 46 is interposed between the faying surfaces of the upper wing skin 38 and the stringer 42. When the TP bonding film 46 is heated to its melt temperature, the melted film flows and intimately contacts the faying surfaces of the upper wing skin 38 and the stringer 42, forming a strong, structural joint between them.

The melt temperature of the TP bonding film will vary with application, however as used herein, “TP bonding film 46” is defined as a TP that has a melt temperature that is less than the glass transition temperature of both the thermoplastic stringer 42 and thermoset upper wing skin 38, respectively, as well as any other composite components in the wing 24. For example and without limitation, where the wing 24 comprises thermoset components having a glass transition temperature of 150° C., and thermoplastic components having a glass transition temperature of 200° C., the TP bonding film 46 should have a melt temperature below approximately 145° C. Thus, when the TP bonding film 46 is heated to its melt temperature, the structural properties of neither the stringer 42 nor the upper wing skin 38 are adversely affected. Subject to the melt temperature limitation mentioned above, the TP bonding film 46 can have a melt temperature in the range between approximately 140° C. and approximately 220° C.

Any of a variety of common TP bonding films 46 can be employed, depending upon the application, but typically it will comprise an admixture of thermoplastic materials that are well-suited for joining thermoplastic and thermoset structures. As will be discussed later, a number of holes 33 (only one shown in FIG. 2) are drilled in the upper wing skin 38 to receive one-sided fasteners 35, sometimes referred to as blind fasteners, in order to mechanically fasten upper wing skin assembly 32 to the substructure 34.

Similar to the upper wing skin assembly 32, lower wing skin assembly 36 comprises a cured lower wing skin 40 stiffened by any number of stringers 42, which in this case comprise vent stringers **42*b*. The lower wing skin assembly 36 comprises a lower wing skin 40 which, similar to the upper wing skin 38, may be a standard modulus, intermediate modulus, intermediate plus, or high modulus CFRP laminate, laid up by an automatic tape or fiber laying or placement machine, and then cured. The lower wing skin 40 may be constructed of either a thermoset prepreg tape and/or woven fabric, or a thermoset resin infused tape, non-crimped fabric, woven fabric and/or braided fabric. Alternatively, the CFRP laminate may be constructed of thermoplastic prepreg tape, woven fabric and/or braided fabric. The stringers 42 forming a part of the lower wing skin assembly 36** comprise a fiber reinforced thermoplastic fabricated either by forming a charge of thermoplastic prepreg to the desired shape, or by resin infusion of dry fibers in a mold.

The stringers 42 are co-bonded to the substructure 34 using strips of TP bonding film 46 which, when heated to its melt temperature and later cooled, form a strong structural joint between the lower wing skin 40 and the substructure 34. In those examples where the lower wing skin 40 is thermoplastic, it may be possible to co-cure the thermoplastic stringers 42 and the lower wing skin 40. The lower wing skin 40 may include any number of access openings 58 to allow service personnel to access components mounted inside the substructure 34. Similar to the upper wing skin assembly 32, the lower wing skin assembly 36 may include any number of drilled holes 37 to receive double-sided fasteners 45 that mechanically fasten the lower wing skin assembly 36 to the substructure 34.

The wing substructure 34 comprises a front spar 48, a rear spar 50, and a plurality of ribs 52, 54 extending between and connected to the front and rear spars 48, 50. In the illustrated example, each of the front and rear spars 48, 50 has a kink 62 along its length, however in other wing examples, the spars 48, 50 may not have such kinks 62. In one example, each of the spars 48, 50 is an intermediate modulus fiber reinforced thermoplastic laminate such as a CFRP constructed of thermoplastic prepreg tape, and/or woven fabric. In another example, each of the spars 48, 50 is a thermoset constructed of thermoset resin infused tape, non-crimped fabric and/or woven fabric.

Figure 8:
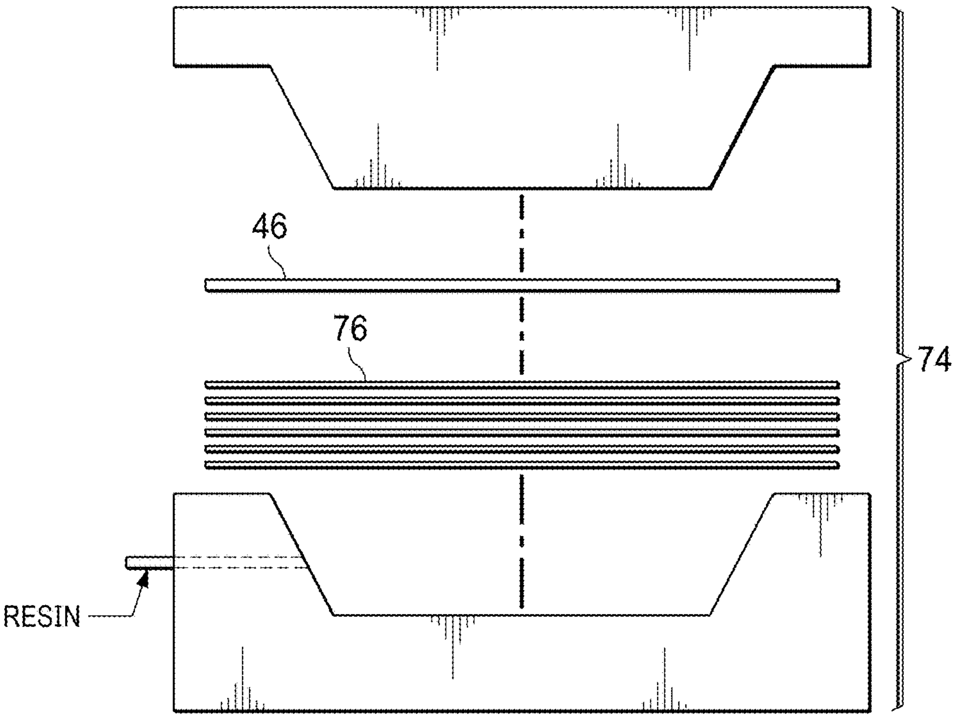
FIG. 8 is an illustration of a diagrammatic view showing how components of a wing can be made by resin infusion of dry fibers in a closed mold.

The spars 48, 50 may be thermoplastic prepreg formed to near net shape, or may be resin infused in a closed mold (see FIG. 8) using any of several known processes such as CAPRI (controlled atmospheric pressure resin infusion), RTM (resin transfer molding), gapped infusion, and CHPRI (controlled high pressure resin infusion) molding. Referring to FIG. 8, when produced by resin infusion, a stack of dry fibers 76 such as carbon fibers covered by a strip of TP bonding film 46 is placed in a closed, heated mold 74. To carry out resin infusion, resin is injected into the mold 74 which infuses the fibers 76. Because the mold 74 is heated, the TP bonding film 46 melts and, to some extent, commingles and combines with the injected resin along the interface between them. However, after removal of the spar (or other part) from the mold 74, the strip of TP bonding film 46 remains present on the surface of the spar, and can therefore be remelted when components such as the ribs are co-bonded to the spar.

The ribs 52, 54 are connected to the spars 48, 50 by brackets 56 attached to the spars 48, 50. The front and rear spars 48, 50 are thermoplastic laminates and have a generally Z shaped cross-sectional geometry (see FIG. 3), however a number of other geometries are possible. Depending on the application, some of the ribs 54 closer to the root 28 (FIG. 1) of the wing 24 may be a metal such as an aluminum alloy, fabricated by forming or machining. However, other ribs 52 as well as the brackets 56 and cleats 72 (shown in FIG. 11) may be a CFRP laminate constructed of thermoplastic prepreg tape, woven fabric and/or braided fabric. Ribs 52, brackets 56 and cleats 72 may be fabricated by any of several techniques, such as by stamping a charge of CFRP prepreg.

The wing substructure 34 typically contains a number of components 60 such as motors that operate control surfaces (not shown), sensors other and electronic components, as well as sealants that may be adversely affected by high temperatures such as those normally required to cure thermosets and high temperature thermoplastic parts. The assembly method described below takes into consideration the temperature sensitivity of these components. However, in some applications, it may be possible to seal or insulate these components before their installation in order to reduce their sensitivity to elevated temperatures required for curing, thereby providing greater flexibility in the process for assembling the wings 24.

Figure 9:
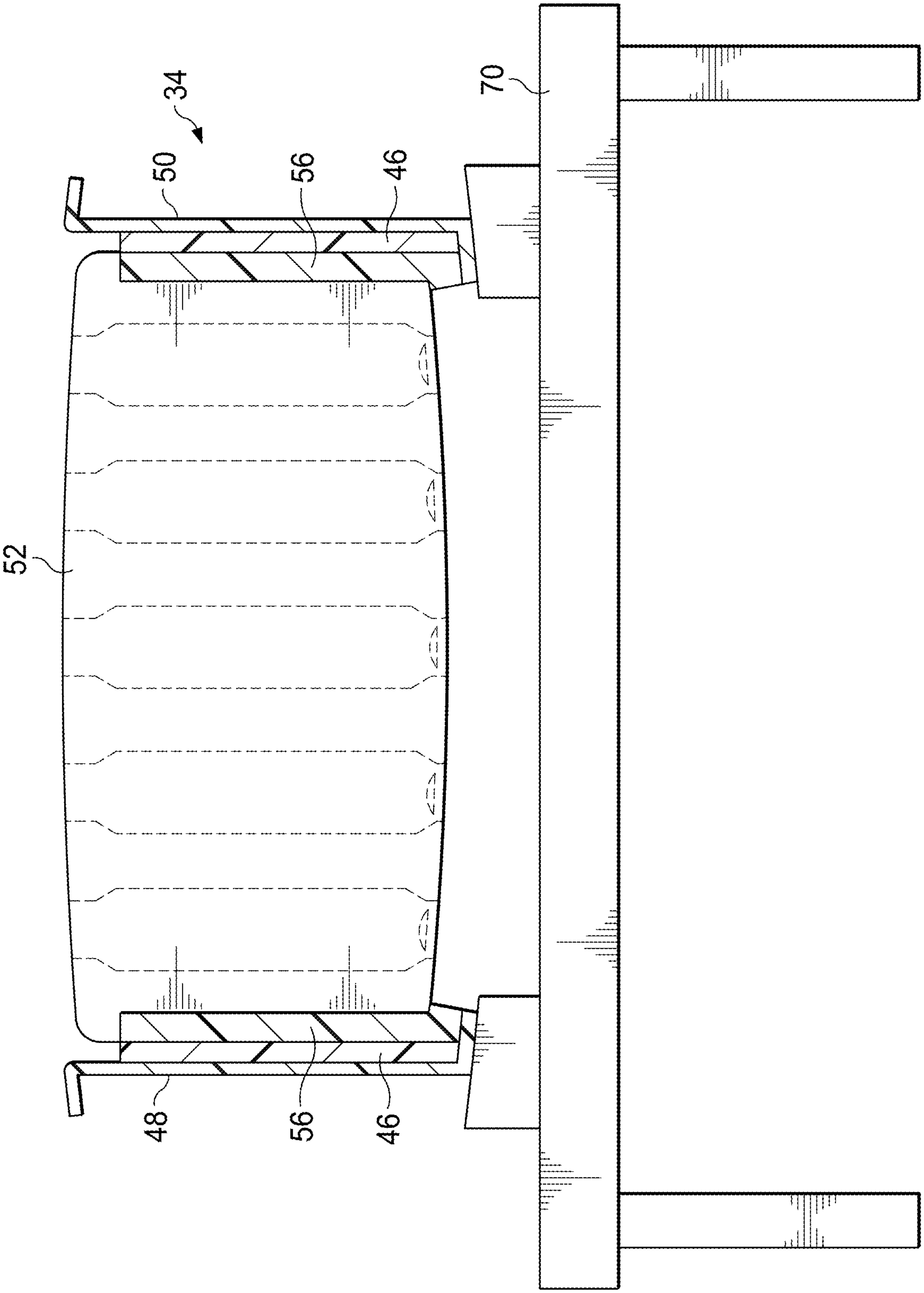
FIG. 9 is an illustration of an end view of the wing substructure supported on an assembly fixture.
Figure 10:
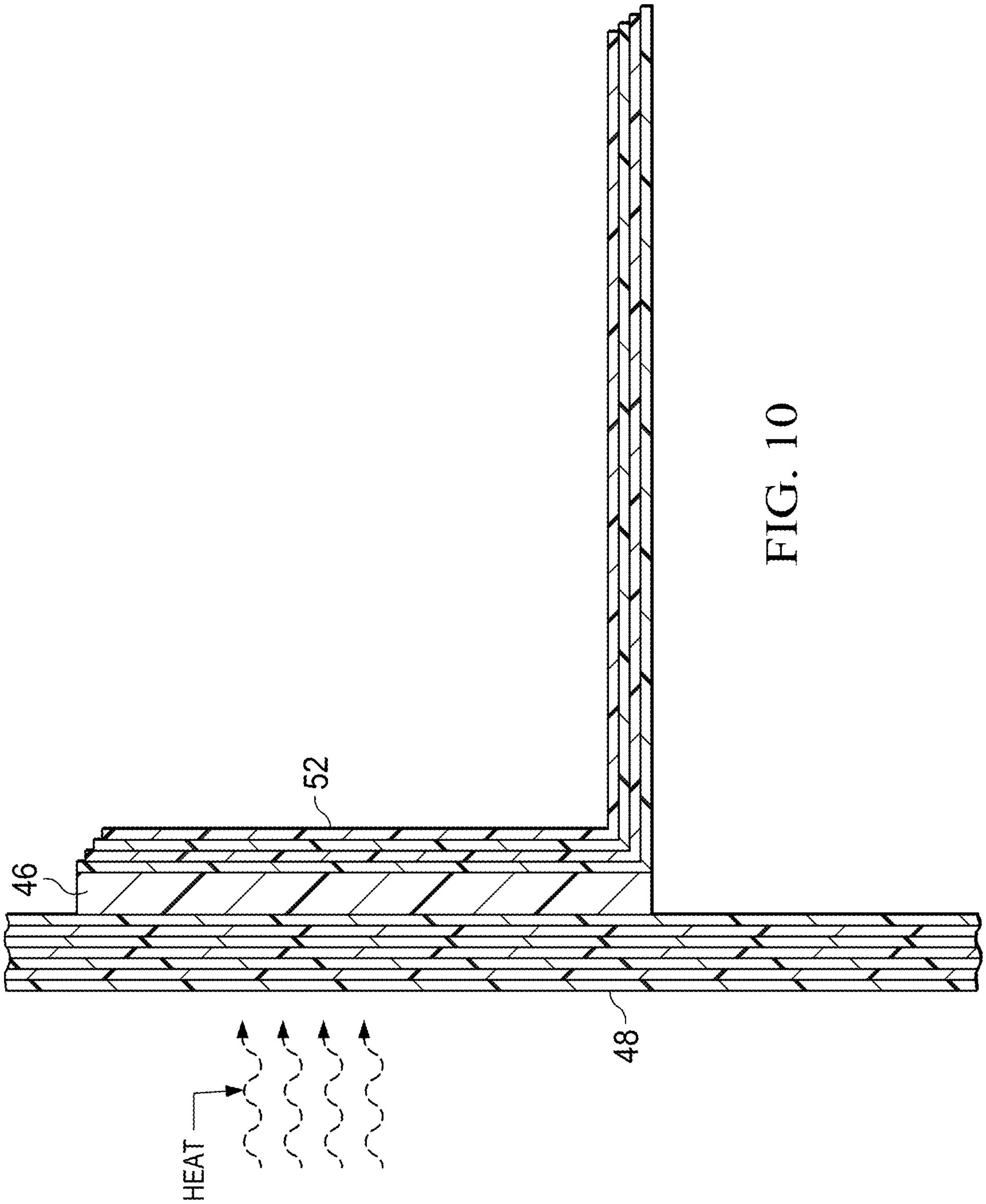
FIG. 10 is an illustration of a diagrammatic, cross-sectional view showing how a rib is co-bonded to a spar by heating thermoplastic bonding film to its melt temperature.

Attention is now directed to FIGS. 9 and 10 which illustrate an initial step in the assembly of the wing substructure 34. The components of the substructure 34 are assembled on an assembly fixture 70 that holds the components in alignment until they can be co-bonded. The spars 48, 50, ribs 52 and brackets 56 are fully cured before being placed in the assembly fixture 70. During the assembly, strips of TP bonding film 46 are placed between the brackets 56 and the spars 48, 50. Then, heat is applied (FIG. 10) in the area of the TP bonding film 46 that is sufficient to melt the TP bonding film 46.

Any of several techniques can be used to heat the TP bonding film 46 to its melt temperature. For example, the partially assembled wing substructure 34 shown in FIG. 9 can be placed in an oven (not shown) where the oven temperature is increased to the melt temperature of the TP bonding film 46, although this approach requires transporting the substructure 34 into an oven that is large enough to house a relatively long wing 24. More desirably in some applications, heat can be locally applied to melt the TP bonding film 46 using induction welding, resistive heating, convection currents, infrared heat or induction welding. As previously discussed, the temperature to which the TP bonding film 46 is heated to achieve its melting is less than the glass transition temperature of any of the other components in the substructure 34, thereby preventing their degradation or structural alteration.

Figure 11:
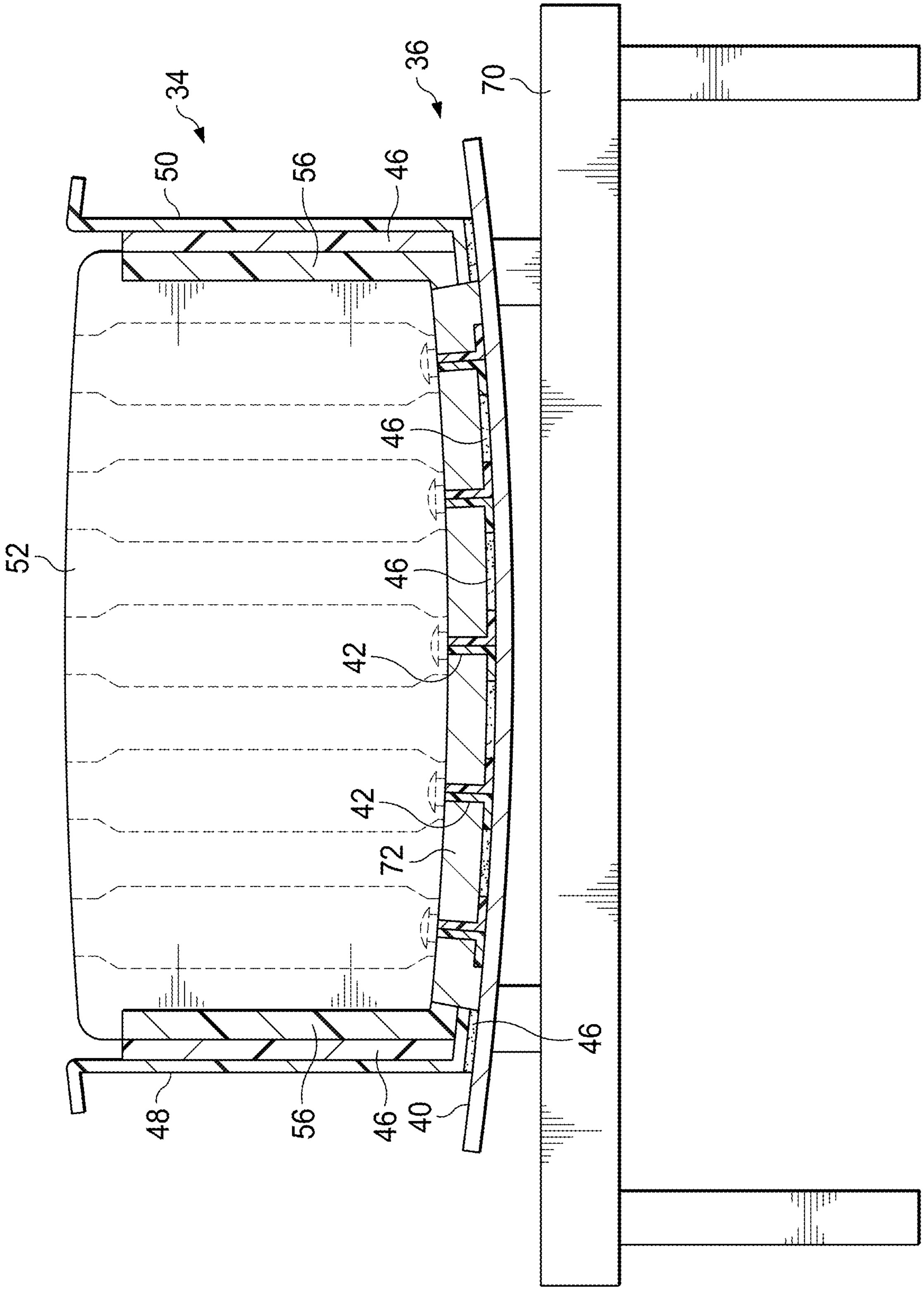
FIG. 11 is an illustration similar to FIG. 10 in which the lower wing skin assembly has been co-bonded to the substructure.

The components of the wing substructure 34 having been fully assembled and co-bonded together, the next step in the assembly process is shown in FIG. 11 in which the lower wing skin assembly 36 is joined to the substructure 34. Straps and cleats 72 are attached to the ribs 52, and strips of the TP bonding film 46 are placed on the wing skin 40, between the stringers 42. The substructure 34 is then lowered onto the lower wing skin assembly 36 following which the TP bonding film 46 is heated to its melt temperature using any of the heating techniques previously described. The melted TP bonding film 46 cools, and thereby co-bonds the lower wing skin assembly 36 to the substructure 34. After the lower wing skin assembly 36 has been co-bonded to the substructure 34, components 60 (FIG. 2) may be installed within the substructure 34. Holes 37 (FIG. 2) may be drilled and double-sided fasteners 45 installed in the lower wing skin 40 after it has been co-bonded to the substructure 34.

Figure 12:
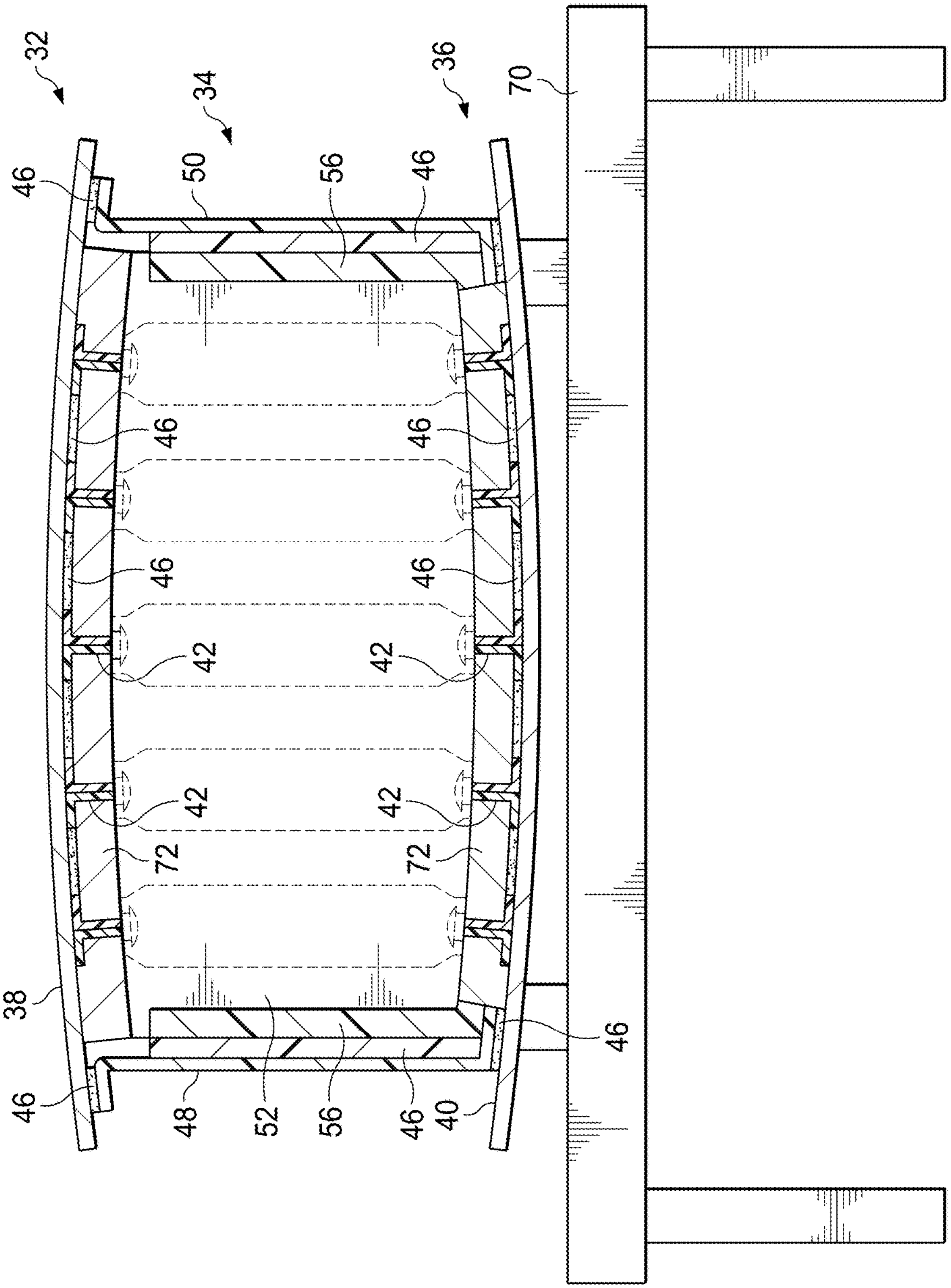
FIG. 12 is an illustration similar to FIG. 11 in which the upper wing skin assembly has been co-bonded to the substructure.

Referring to FIG. 12, the upper wing skin assembly 32 is similarly co-bonded to the substructure 34. After straps and cleats 72 are attached to the ribs 52, strips of TP bonding film 46 are placed on the upper wing skin 38, between the stringers 42 and heated to their melt temperature, thereby co-bonding the upper wing skin assembly 32 to the substructure 34. Holes 33 (FIG. 2) may be drilled and single-sided fasteners 35 installed in the upper wing skin 38 after it has been co-bonded to the substructure 34. It should be noted here that in the example described above, the lower wing skin assembly 36 is co-bonded to the substructure 34 before the upper wing assembly 32 is co-bonded to the substructure 34. In other examples however, this assembly sequence may be reversed; in other words, the upper wing skin assembly 32 is co-bonded to the substructure 34 before the lower wing skin assembly 36 is co-bonded to the substructure 34.

Figure 13:
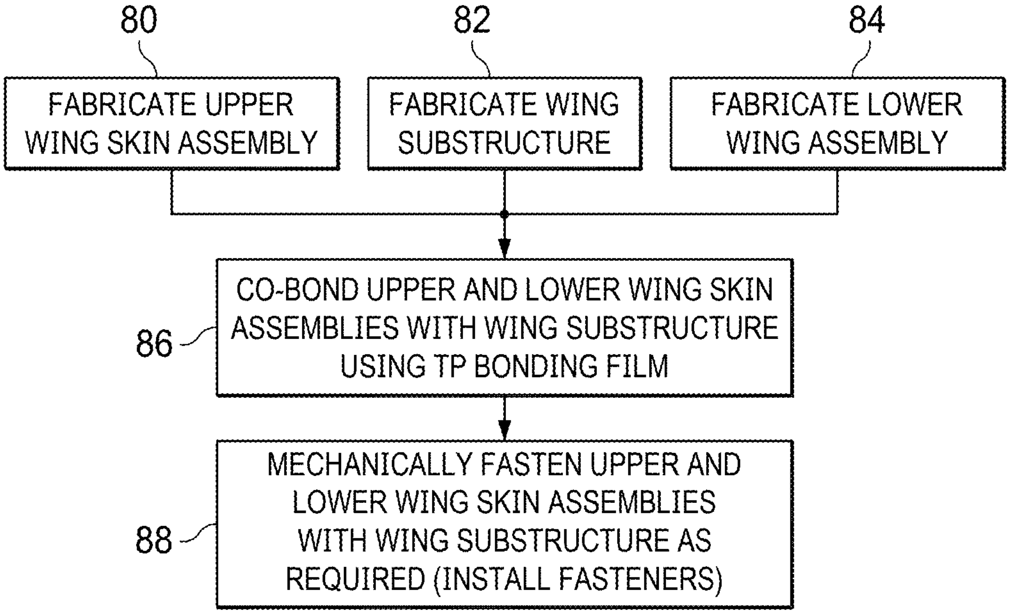
FIG. 13 is an illustration of a flow diagram broadly showing the steps of a method of making the wing.

Attention is now directed to FIG. 13 which broadly illustrates steps of a method of making a hybrid composite wing 24. The upper wing skin assembly 32, wing substructure 34 and lower wing skin assembly 36 are fabricated at steps 80, 82 and 84 respectively. These fabrication steps can be carried out in parallel rather than in series with each other, thereby expediting the production process. At 86, the upper and lower wing skin assemblies 32, 36 are co-bonded with the wing substructure 34 using TP bonding film 46. At 88, the upper and lower wing skin assemblies 32, 36 are mechanically fastened to the wing substructure 34, as may be desired.

Figure 14:
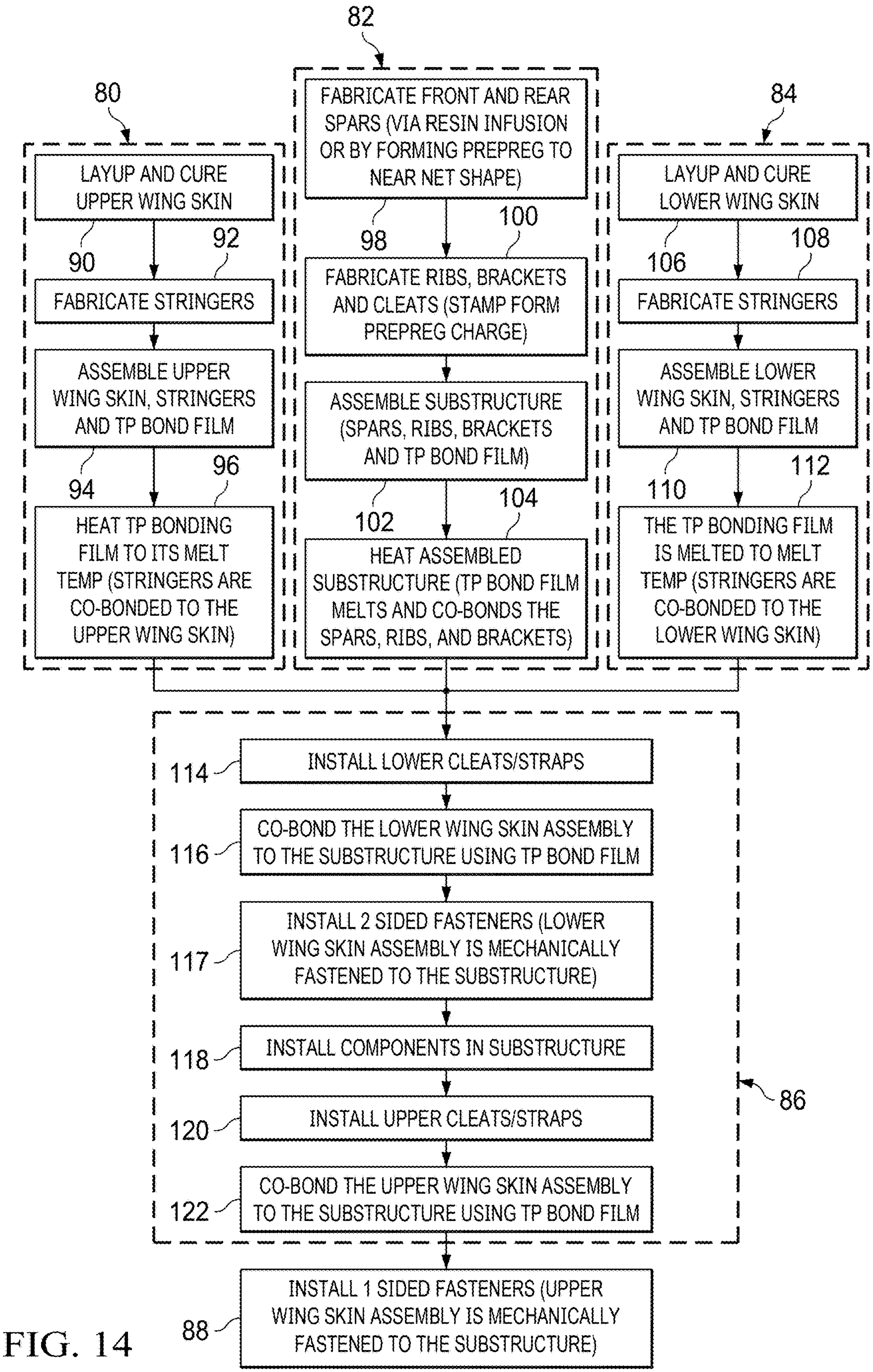
FIG. 14 is an illustration of a flow diagram showing additional details of the method shown in FIG. 13.

FIG. 14 illustrates additional details of the method shown in FIG. 13. Fabricating the upper wing skin assembly 32 at 80 begins with laying up and curing an upper wing skin 38 at 90, and fabricating composite stringers 42 at 92. Although these two steps are shown as being carried out in series, they may be carried out in parallel thereby expediting the production process. At 94, upper wing skin assembly 32 is assembled using TP bonding film 46 to co-bond the stringers 42 the upper wing skin 38. Finally, at 96, stringers 42 are co-bonded the upper wing skin 38 by melting the TP bonding film 46 to its melt temperature. A similar series of steps are carried out to fabricate the lower wing skin assembly 36 at step 84. The lower wing skin 40 is laid up and cured at 106, and the stringers 42 are fabricated at 108. Then at 110, the lower wing skin 40, stringers 42 and TP bonding film 46 are assembled, following which, at 112, the TP bonding film 46 is heated to its melt temperature, co-bonding the stringers 42 to the lower wing skin 40.

At step 86, joining the upper and lower wing skin assemblies 32, 36 to the wing substructure 34 begins with installing lower cleats/straps 72 at 114, following which at 116 the lower wing skin assembly 36 is co-bonded to the substructure 34 using the TP bonding film 46. At 117 double-sided fasteners 45 are installed in the lower wing skin 40 thereby mechanically fastening the lower wing skin assembly 36 to the substructure 34. At 118, components such as motors, sensors and electronics may be installed within the substructure 34, as desired.

Upper cleats/straps 72 are installed at 120, following which at 88, single-sided fasteners are installed, as desired, in the upper wing skin 38, thereby mechanically fastening the upper wing skin assembly 32 to the substructure 34. The example shown in FIG. 14, lower wing skin assembly 36 is co-bonded to the substructure 34 before the upper wing skin assembly 32 is co-bonded to the substructure 34. This assembly sequence allows any number of components (FIG. 2) to be installed before the wing 24 is completed by co-bonding the upper wing skin assembly 32 to the substructure 34. However, in other examples, as mentioned earlier it may be possible to co-bond the upper wing skin assembly 32 to the substructure 34 before lower wing skin assembly 36 is co-bonded to the substructure 34.

Figure 15:
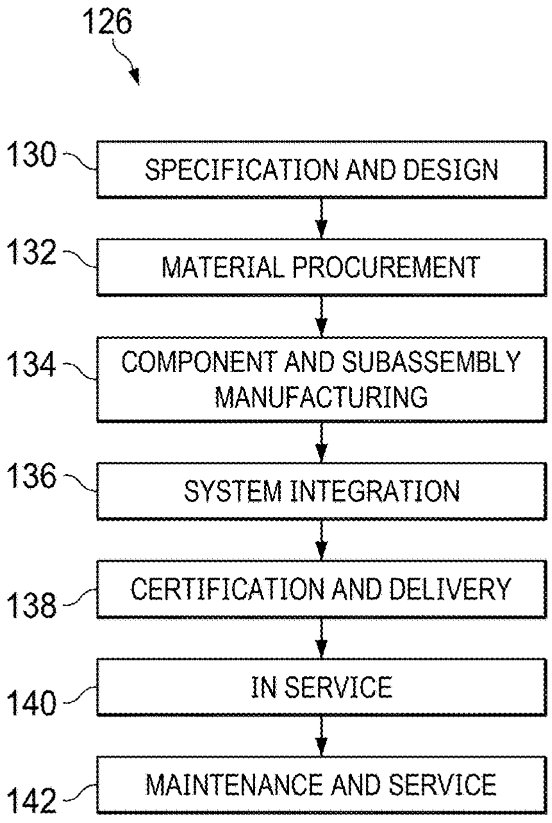
FIG. 15 is an illustration of a flow diagram of aircraft production and service methodology.
Figure 16:
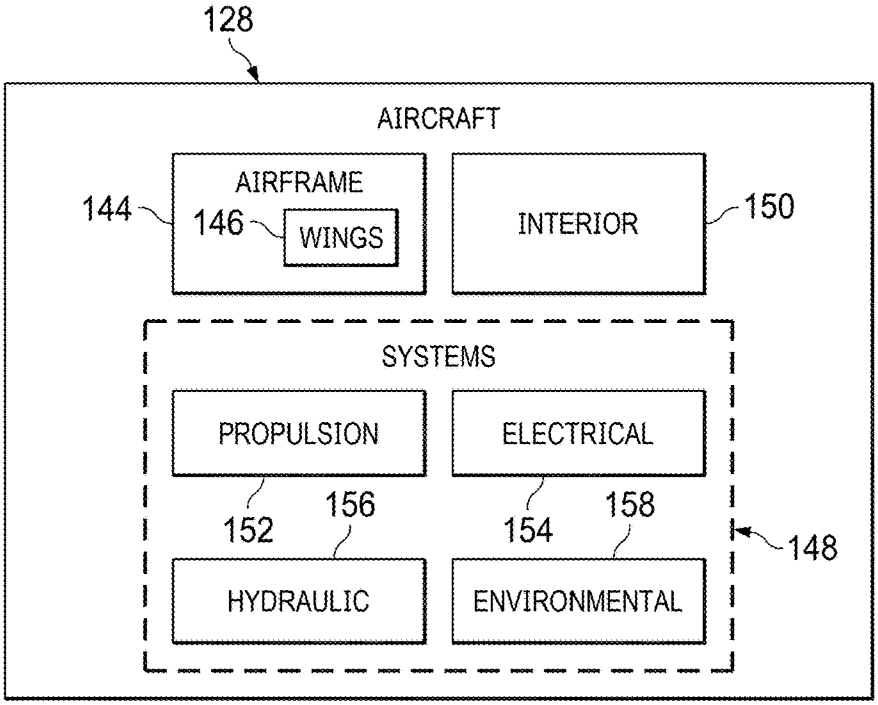
FIG. 16 is an illustration of a block diagram of an aircraft.

Examples of the disclosure may find use in a variety of potential applications, particularly in the transportation industry, including for example, aerospace, and other application where long, wing-like structures are used, particularly those having a high aspect ratio and are subject to deflection. Thus, referring now to FIGS. 15 and 16, examples of the disclosure may be used in the context of an aircraft manufacturing and service method 126 as shown in FIG. 15 and an aircraft 128 as shown in FIG. 16. Aircraft applications of the disclosed examples may include wings subject to aeroelastic bending. During pre-production, the method 126 may include specification and design 130 of the aircraft 128 and material procurement 132. During production, component and subassembly manufacturing 134 and system integration 136 of the aircraft 128 takes place. Thereafter, the aircraft 128 may go through certification and delivery 138 in order to be placed in service 140. While in service by a customer, the aircraft 128 is scheduled for routine maintenance and service 142, which may also include modification, reconfiguration, refurbishment, and so on.

Each of the processes of method 126 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 128 produced by method 126 may include an airframe 144 including wings 146, with a plurality of high level systems 148 and an interior 150. Examples of high-level systems 148 include one or more of a propulsion system 152, an electrical system 154, a hydraulic system 156 and an environmental system 158. Any number of other systems may be included.

Systems and methods embodied herein may be employed during any one or more of the stages of the aircraft manufacturing and service method 126. For example, components or subassemblies corresponding to component and subassembly manufacturing 134 may be fabricated or manufactured in a manner similar to components or subassemblies produced while the aircraft 128 is in service. Also, one or more apparatus examples, method examples, or a combination thereof may be utilized during the component and subassembly manufacturing 134 and system integration 136, for example, by substantially expediting assembly of or reducing the cost of an aircraft 128. Similarly, one or more of apparatus examples, method examples, or a combination thereof may be utilized while the aircraft 128 is in service, for example and without limitation, to maintenance and service 142.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different as advantages compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An airplane wing, comprising:

a wing substructure including a composite front spar, a composite rear spar and a plurality of composite ribs extending between the composite front spar and the composite rear spar;

an upper wing skin assembly including a composite upper wing skin and a first plurality of composite stringers co-bonded to the composite upper wing skin by a thermoplastic bonding film that has a melt temperature less than a glass transition temperature of the composite upper wing skin and the first plurality of composite stringers, wherein the upper wing skin assembly is co-bonded to the wing substructure by a thermoplastic bonding film that has a melt temperature less than a glass transition temperature of the wing substructure; and a lower wing skin assembly including a composite lower wing skin and a second plurality of composite stringers co-bonded to the composite lower wing skin by a thermoplastic bonding film that has a melt temperature less than a glass transition temperature of the composite lower wing skin and the second plurality of composite stringers, wherein the lower wing skin assembly is co-bonded to the wing substructure by a thermoplastic bonding film that has a melt temperature less than a glass transition temperature of the wing substructure.

2. The airplane wing of claim 1, wherein each of the composite ribs is co-bonded to the composite front spar and composite rear spar by a thermoplastic bonding film that has a melt temperature less than the glass transition temperature of the wing substructure.

3. The airplane wing of claim 1, wherein the thermoplastic bonding film has a width at least as great as the width of the first plurality of composite stringers.

4. The airplane wing of claim 1, further comprising fasteners fastening the lower wing skin assembly to the wing substructure.

5. The airplane wing of claim 4, wherein each of the fasteners is a double-sided fastener.

6. The airplane wing of claim 1, wherein the composite lower wing skin comprises one or more access opening.

7. The airplane wing of claim 5, further comprising fasteners fastening the upper wing skin assembly to the wing substructure on which the lower wing skin assembly is fastened.

8. The airplane wing of claim 7, wherein each of the fasteners fastening the upper wing skin assembly to the wing substructure is a single-sided fastener.

9. The airplane wing of claim 1, wherein each of the first plurality of composite stringers and the second plurality of composite stringers is a thermoplastic laminate.

10. The airplane wing of claim 1, wherein each of the composite front spar and the composite rear spar is a fiber reinforced thermoset.

11. The airplane wing of claim 1, wherein each of the composite ribs is a fiber reinforced thermoplastic laminate.

12. The airplane wing of claim 1, wherein each of the composite upper wing skin and the composite lower wing skin is a fiber reinforced thermoset laminate.

13. A method fabricating an airplane wing, comprising:

making an upper composite wing skin assembly;

making a lower composite wing skin assembly;

making a wing substructure; and, attaching the upper composite wing skin assembly and the lower composite wing skin assembly to the wing substructure, including co-bonding at least one of the upper composite wing skin assembly and the lower composite wing skin assembly to the wing substructure using a thermoplastic bonding film, and fastening another of the other of the upper composite wing skin assembly and the lower composite wing skin assembly to the wing substructure using single-sided fasteners, wherein the thermoplastic bonding film has a melt temperature less than a glass transition temperature of the wing substructure.

14. The method of claim 13, wherein the co-bonding includes:

interposing a strip of the thermoplastic bonding film between the wing substructure and the at least one of the upper composite wing skin assembly and the lower composite wing skin assembly, heating the strip to a melt temperature of the thermoplastic bonding film.

15. The method of claim 14, wherein heating is performed by one of:

oven heating, resistive heating, infra-red heating, and induction welding.

16. The method of claim 13, wherein:

making the wing substructure includes fabricating a front composite spar, a rear composite spar and a plurality of composite ribs, and the co-bonding includes spacing strips of the thermoplastic bonding film between the front composite spar and rear composite spar and the at least one of the upper composite wing skin assembly and the lower composite wing skin assembly.

17. The method of claim 16, wherein fabricating each of the front composite spar and the rear composite spar formed by resin infusion of dry fibers in a closed mold.

18. The method of claim 16, wherein fabricating each of the front composite spar and the rear composite spar includes forming a charge of thermoset prepreg to near net shape.

19. The method of claim 16, wherein fabricating each of the composite ribs performed by resin infusion using thermoplastic resin.

20. The method of claim 13, wherein the attaching includes co-bonding the lower composite wing skin assembly to the wing substructure before the upper composite wing skin assembly is attached to the wing substructure.

* * * * *